United States Patent [19]
Woebcke et al.

[11] 3,958,951
[45] May 25, 1976

[54] CONVECTIVE POWER REFORMER EQUIPMENT AND SYSTEM

[75] Inventors: Herman N. Woebcke, Wayford; Chi Sheng Kuo, Scituate, both of Mass.

[73] Assignee: Stone & Webster Engineering Corporation, Boston, Mass.

[22] Filed: Apr. 9, 1974

[21] Appl. No.: 459,311

[52] U.S. Cl. ........................... 23/288 M; 23/277 R; 23/288 K; 23/289; 48/196 R; 110/1 R; 122/283; 122/494; 252/373
[51] Int. Cl.² ......................... B01J 8/06; C01B 1/18
[58] Field of Search ............ 23/288 M, 288 R, 289, 23/277 R, 288 K; 48/196 R; 122/510, 511, 512

[56] References Cited
UNITED STATES PATENTS

| | | | |
|---|---|---|---|
| 2,108,081 | 2/1938 | Shabaker et al. | 23/288 R |
| 2,198,555 | 4/1940 | Wilson et al. | 23/288 M |
| 2,283,832 | 5/1942 | Thomas | 23/288 M X |
| 2,545,384 | 3/1951 | Rehrig | 23/288 R |
| 2,548,519 | 4/1951 | Cummings | 23/288 R |
| 2,594,330 | 4/1952 | Mayhew | 23/277 R X |
| 2,647,495 | 8/1953 | Moore | 122/333 |
| 2,878,789 | 3/1959 | Huet | 23/288 M UX |
| 2,884,372 | 4/1959 | Bergstrom | 23/288 R X |
| 3,257,172 | 6/1966 | Kao et al. | 23/288 M X |
| 3,469,624 | 9/1969 | Koppe | 23/289 X |

*Primary Examiner*—Joseph Scovronek
*Attorney, Agent, or Firm*—Morgan, Finnegan, Pine, Foley & Lee

[57] ABSTRACT

A reformer furnace having a convection section, means for preventing radiant heat from the burners to the convection section, a centrally disposed effluent tube suspended from the top of the furnace, a tube sheet surrounding and suspended from the centrally disposed effluent tube and reformer tubes suspended from the tube sheet which reformer tubes are in communication with the interior of the effluent tube. The related equipment disclosed include a honeycomb sandwich tube sheet, a perforated semi-spherical combustion shield and vessel wall insulation structure including a purge gas annular space.

15 Claims, 7 Drawing Figures

CONVECTIVE POWER REFORMER EQUIPMENT AND SYSTEM

BACKGROUND OF THE INVENTION

1. Field of the Invention

The invention relates to an integrated process for producing hydrogen rich gas in a reformer furnace, reformer furnaces and furnace structure. More specifically, the invention relates to a reformer furnace operating under pressure on both the process and heat side. The invention has particular application for producing hydrogen rich gas for commercial size coal gasification plants.

2. Description of the Prior Art

Recently, considerable interest has been generated in producing gas for energy requirements by coal gasification. Certain commercial size coal gasification plants demand large quantities of hydrogen rich gas. Hydrogen rich gas is also currently used on a large scale in the commercial synthesis of ammonia.

Large amounts of gaseous hydrogen and carbon monoxide mixtures, commonly referred to as synthesis gas, are currently required for use in commercial size plants producing methanol from natural gas or light hydrocarbons.

The hydrogen rich gas and synthesis gas required for commercial applications are produced by reformer furnaces. The commercial reforming process is carried out in a reformer furnace wherein a stream of hydrocarbon and steam is passed through the furnace tubes which are filled with catalyst, such as nickel oxide. The reforming reaction is commonly carried out in the temperature range of 1000° to 1500°F. or lower.

The conventional hydrocarbon reforming furnace is a radiant type furnace wherein the heat source is derived from the combustion of a hydrocarbon fuel and air at atmospheric pressure. The present state of the art radiant type reformer furnaces are very large and expensive and require considerable fuel.

Furnaces which operate under pressure also exist. One such furnace is disclosed in U.S. Pat. No. 3,582,296 (June 1, 1971). Basically, the furnace therein is designed to operate with the pressure difference between the process stream and the high-temperature heating gas as small as possible. The furnace is designed to provide heating essentially by radiation and rely on bringing the combustion gas in the heating zone as close as possible to the theoretical combustion flame temperature. Another furnace designed to operate under pressure is the compact convective reactor shown in U.S. Pat. No. 3,688,494 (Sept. 5, 1972).

SUMMARY OF THE INVENTION

It is an object of this invention to provide a reformer furnace and process for providing hydrogen rich gas or synthesis gas.

It is a further object of the invention to provide a furnace which operates under pressure on both the process and combustion side and which provides heat to the process side essentially by convection.

Another object of the invention is to provide a furnace which can be used as the reformer furnace in an integrated system for reforming hydrocarbon feed into hydrogen.

Thus, the furnace of this invention is designed to avoid heating of the process tubes by radiation from the furnace burner. A single burner, preferably or alternatively, a plurality of burners, are located centrally at the bottom of the furnace in one combustion chamber. The combustion chamber is provided with a partial semi-spherical perforated shield to allow the hot combustion gases to travel from the combustor to the process tubes but prevent flame impingement on the process tubes and prevent direct exposure of radiant heat from the burner to the process tubes. The process tube assembly is comprised of a tube sheet mounted at a relatively high elevation in the furnace, process tubes which extend from the tube sheet and a large center tube in which the process tubes terminate. The process tubes are provided with small diameter inlet and outlet sections on each end and a very long center section. In the reformer furnace embodiment the center section is filled with catalyst. The tube sheet is of sandwich construction The furnace is provided with insulation in the form of a plurality of aligned engaging jackets. Each jacket is separated from the vessel wall to define a small annular space which is adapted to receive relatively cool purge gas having a pressure slightly greater than that of the interior of the furnace.

The process of the invention is directed to the use of flue gas in the furnace as a system recycle medium. Flue gas discharged from the furnace is used to heat the system furnace hydrocarbon feed. In addition, a portion of the flue gas is recompressed and recycled to the furnace for mixing with combustion fuel and compressed air. Another portion of the flue gas is fed to the turbine of an air compressor to assist in driving the turbine.

DESCRIPTION OF THE DRAWINGS

The invention will be better understood when considered with the attached drawings of which:

FIG. 7 is a schematic diagram of the overall system of the furnace.

DESCRIPTION OF THE PREFERRED EMBODIMENT

The furnace of the present invention is suitable for many applications. The particular furnace of the present invention can be used in virtually every service where catalytic and non-catalytic cracking is desired. However, the invention will be described in detail as a reformer furnace wherein catalytic cracking occurs.

Figure 1:
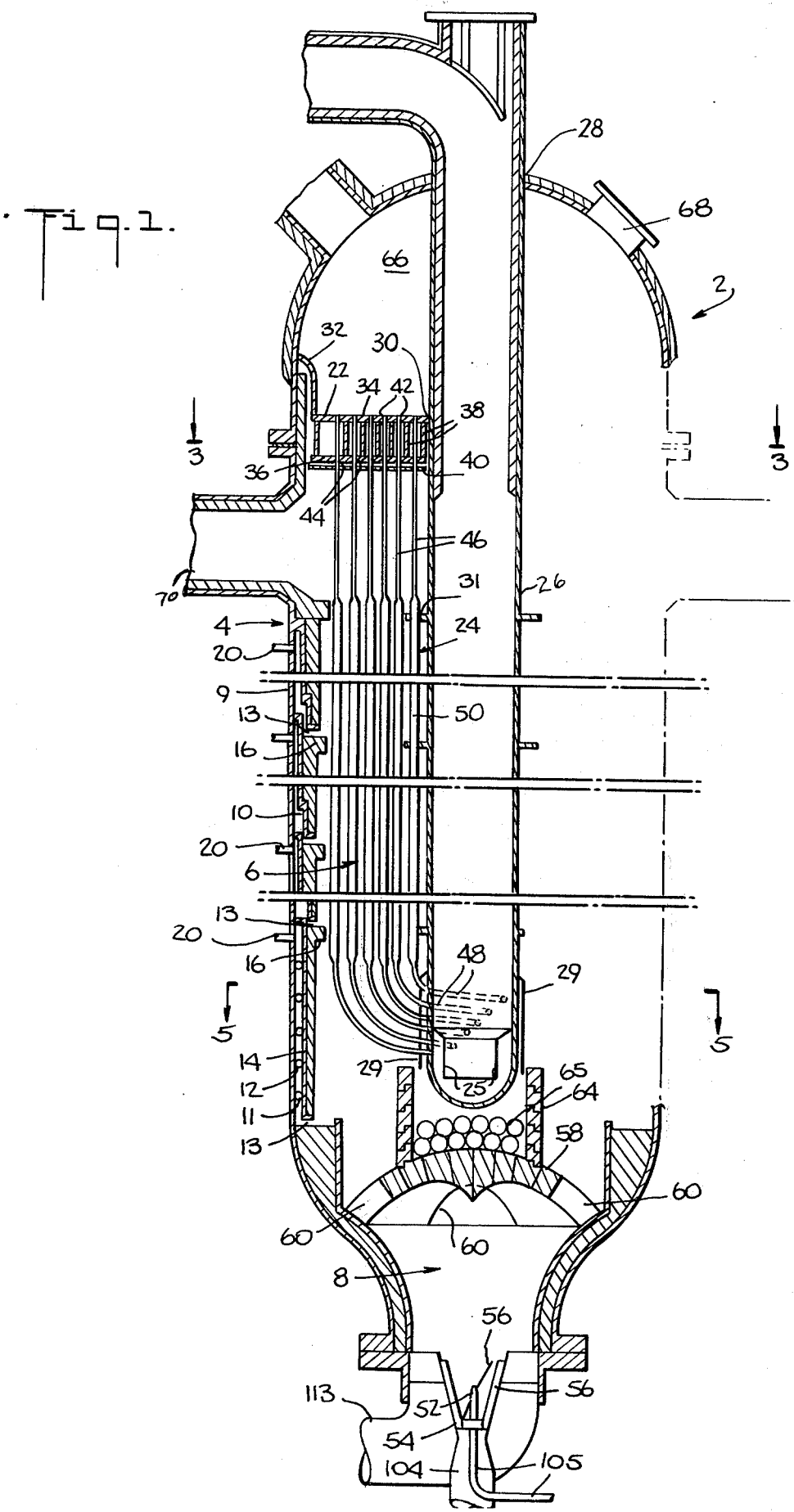
FIG. 1 is a sectional elevational drawing of the furnace of the present invention depicted as particularly suited for use as a reformer furnace.

The reformer furnace 2 of the subject invention, as best seen in FIG. 1, is comprised essentially of three main sections, the vessel shell assembly 4, the process tube assembly 6 and the combustion section 8.

Figure 4:
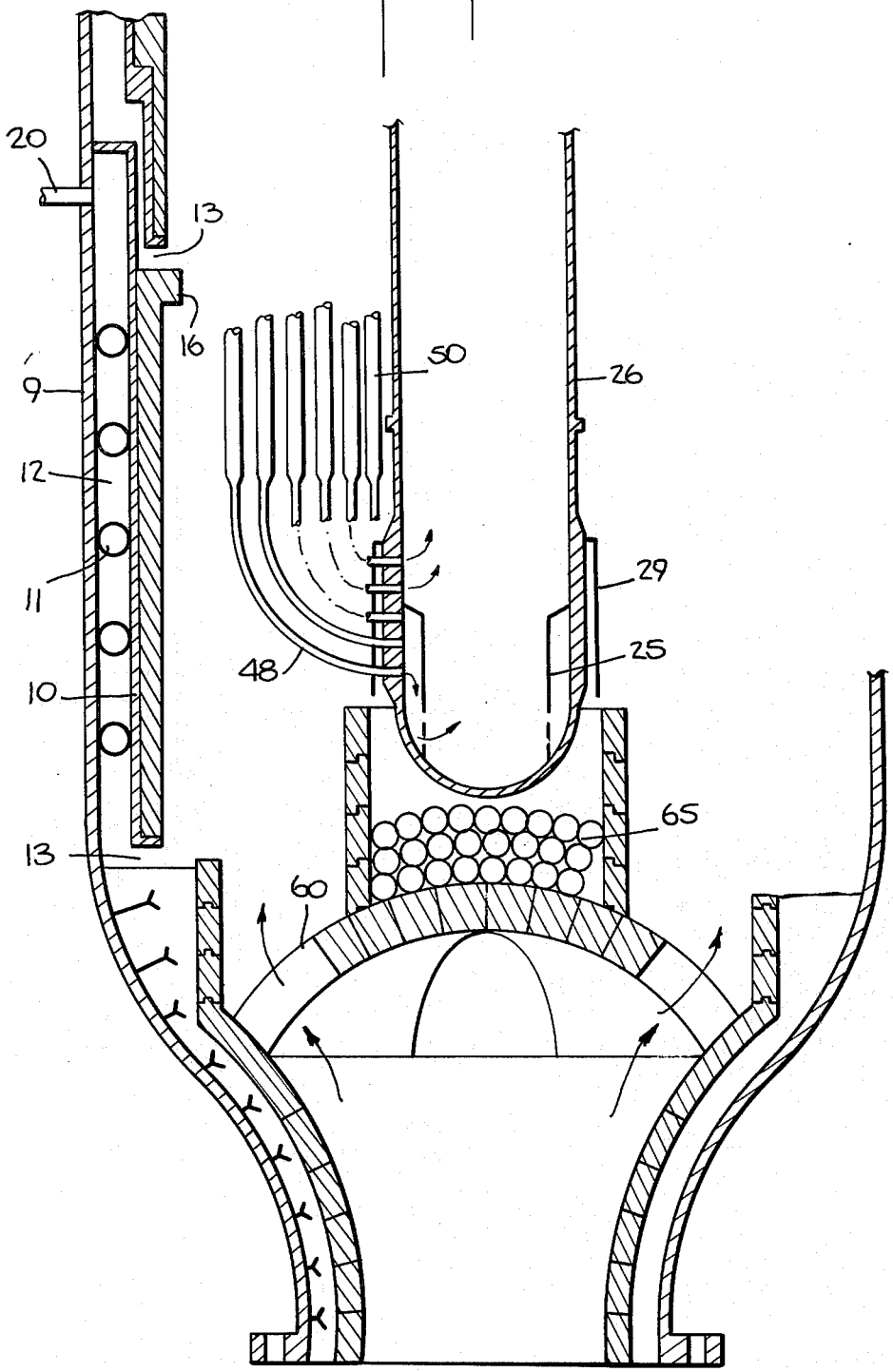
FIG. 4 is an enlarged partial sectional elevation showing the burner structure and the structure of the insulation jackets of the furnace of FIG. 1.

The vessel shell assembly 4 consists of the outer shell 9, the insulation jackets 10 and the purge gas chambers 12 defined by the outer surface of the jacket 10 and the inner surface of the shell 9. As best seen in FIGS. 1 and 4, each refractory jacket 10 is configured cylindrically or in the configuration of the inside wall of the vessel shell 9, and is joined to the vessel wall at one end, preferably the upper end. The outside wall 14 of each jacket is of a diameter smaller than the diameter of the inside of the vessel shell 9 to define the purge gas chamber 12 associated with each insulation jacket 10. The purge gas chamber 12 is provided with means to maintain the proper distance between the insulation jacket 10 and the outer wall of the shell 9. The means for separation can take any form but one particularly suitable form is a bar 11 arranged in a spiral from top to bottom of the purge gas chamber 12. Each chamber 12 terminates in an annular opening 13 to provide communication between the chamber 12 and the furnace interior. Each chamber 12 is provided with a separate purge gas inlet 20 through which purge gas enters at a pressure slightly higher than the pressure on the combustion gas side of the reformer furnace 2. In practice, the purge gas is cooled flue gas from the furnace 2. Each insulation jacket 10 is provided with refractory corbelling 16 to limit any excessive deflection of the outer process tubes and to prevent channeling of the flue gas in the furnace 2.

Figure 3:
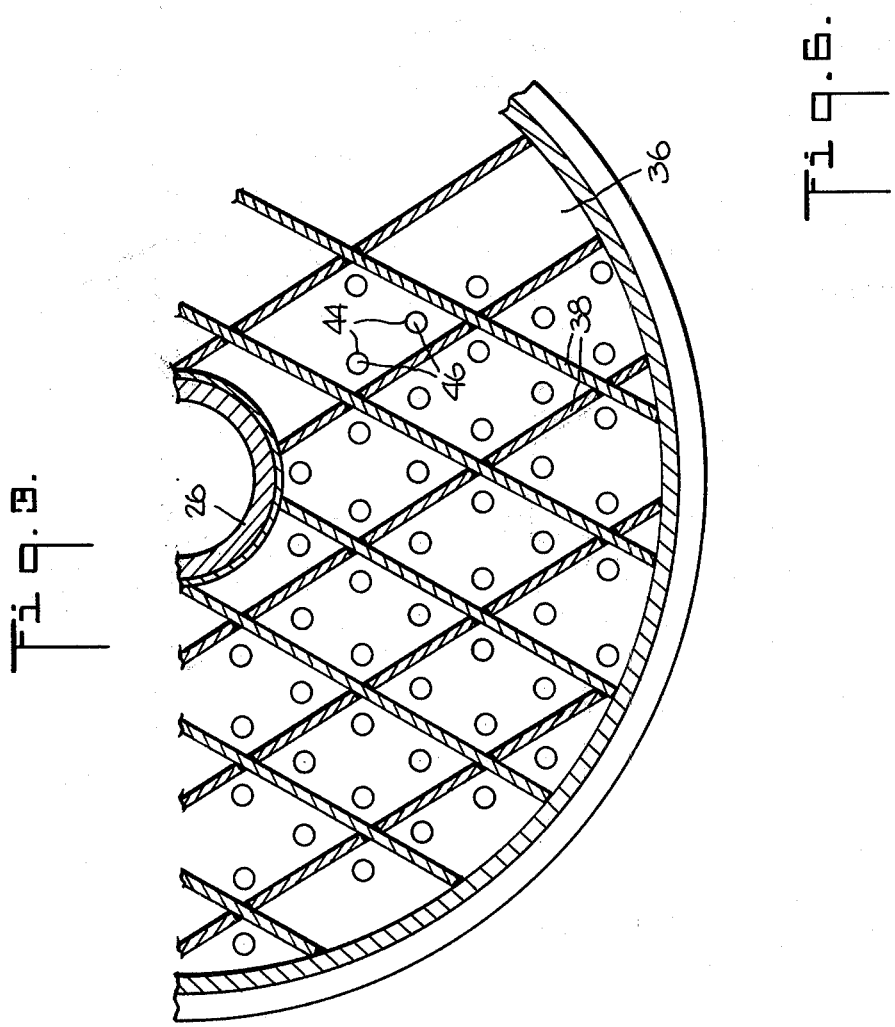
FIG. 3 is a sectional plan view taken through line 3—3 of FIG. 1 showing the web construction of the tube sheet.

The reformer tube assembly 6 is comprised of the tube sheet 22, reformer tubes 24 and central tube 26. The central tube 26 is axially disposed within the reformer furnace 2 and extends upwardly through the top of the furnace 2. The upper end of the central tube 26 is the furnace outlet 27 for the process fluid. In practice, the center tube 26 is secured to the upper opening 28 in the furnace 2 by any appropriate means such as welding. The tube sheet 22, as best seen in FIGS. 1 and 3, is formed of an upper sheet 34, a lower sheet 36 and an internal web assembly 38. The tube sheet 22 is provided with a centrally disposed opening 30 which conforms to the contour of the center tube 26 and is secured thereto for support by a strength weld which attaches the upper sheet 34 of the tube sheet to the center tube 26. Additional support is provided by attachment of the tube sheet 22 to the inside of the furnace by means such as an elongated support section 32. The support section 32 is continuous and is sealed at both the furnace wall and the tube sheet 22. Thermal baffles 40 are also provided to protect the tube sheet 22 from the hot flue gases. The tube sheet 22 is provided with aligned holes 42 and 44 in the upper sheet 34 and the lower sheet 36, respectively.

The reformer tubes 24 are provided with a large central section 50, inlet tube sections 46 and outlet tube sections 48. The large central section 50 comprises by far the greatest portion of each reformer tube 24 and is the only section filled with catalyst. The inlet tubes 46 extend from the upper surface of the top tube sheet 34 through the holes 44 in the lower tube sheet 36 and are secured by strength weld to the top sheet 34 of the tube sheet assembly 22. The diameter of the inlet tube section 46 is considerably smaller than that of the reformer tube central section 50. Thus, close spacing of the reformer tube center section 50 is afforded with attendant minimization of the flue gas restriction near the flue gas outlet and minimization of heat transfer to the heat process stream in the inlet tube sections 46 where catalyst is not present.

Figure 5:
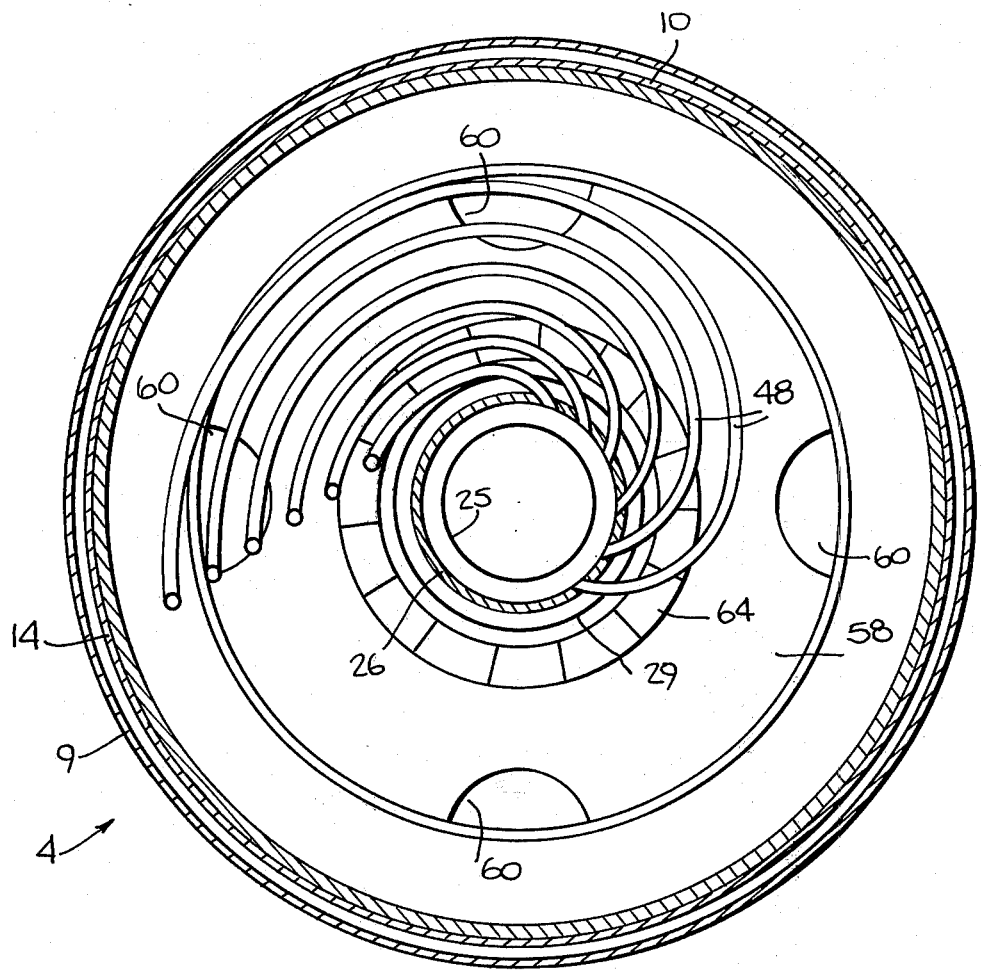
FIG. 5 is a sectional plan view taken through line 5—5 of FIG. 1.
Figure 2:
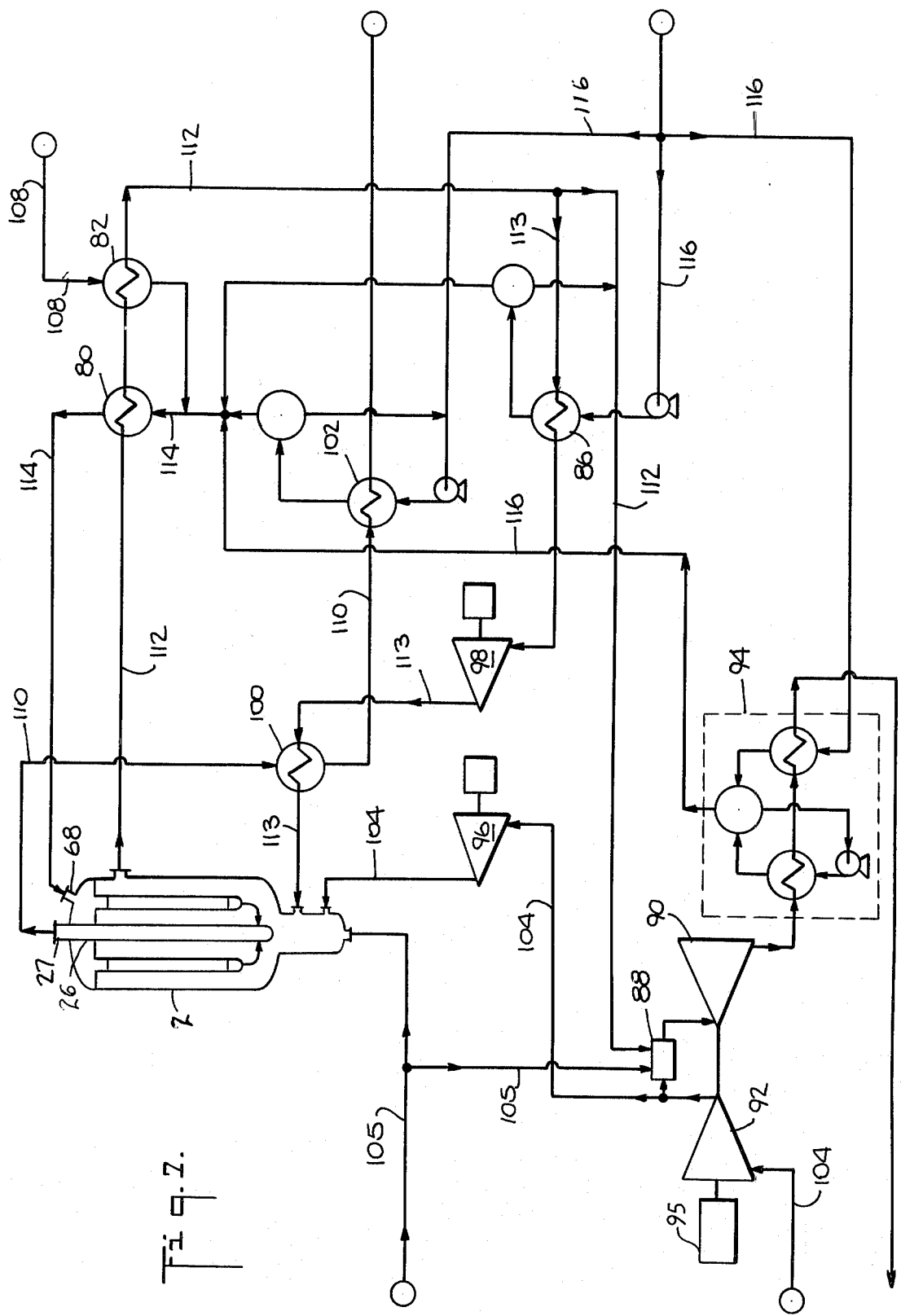

The outlet tube sections 48 of the reformer tubes 24 are also considerably smaller in diameter than the center section 50 of the reformer tubes. As best seen in FIG. 5, the outlet tube sections 48 are contoured to extend to and into the central tube 26 in a somewhat helical or skew pattern. The skew pattern of the outlet tube sections 48 affords an inherent thermal expansion means for the reformer tubes 24. The small size of the outlet tube 48 again minimizes interference with the flow of combustion gases allowing minimally restricted access to the central sections 50 of the process tubes 24 containing the catalyst and minimizing the amount of heat transfer to the outlet tube 48 wherein catalyst is not present.

The central tube 26 of the tube assembly 6 is essentially a straight tube for conveying the process fluid emanating from the process tubes 24 out of the furnace 2 through outlet 27. The central tube 26 is provided with a thermal shroud 29 to shield the lower portion of the central tube 26 from the hot combustion gases. The thermal shroud 29 extends downwardly from the central tube 26 at a location above the bottom of the central section 50 of the process tubes. A cylindrically shaped flow diverter 25 is also provided in the interior of the lower portion of the central tube 26. The flow diverter 25 is arranged to downwardly divert the flow of process fluid from the outlet tube sections 48 of the reformer tubes 24. Thus, process fluid flowing from the outlet tube sections 48 flows over and impinges on the inside surface of the bottom of the central tube 26. This design further protects the lower portion of the central tube 26 from damage due to the hot combustion gases.

Tube guides 31 are arranged on the central tube 26 and extend outwardly from the central tube 26 into the area of the process tubes 24. The tube guides 31 function similar to the corbelling 16 to provide both a means for preventing excessive deflection of the process tubes 24 and for preventing channeling of the furnace combustion gas. Additionally a multiplicity of circular washer type spacer rings 75 are welded to the process tubes 24 outer periphery in staggered arrangement to prevent excessive deflection and vibration of the process tubes.

The combustion section 8 of the furnace is comprised preferably of a single burner 52 arranged in a venturi or converging-diverging section 54 and a plurality of fixed curved blades 56 to direct the combustion gas leaving the burner 52 in a spiral path to facilitate uniform mixing of fuel, air and flue gas. The combustion section 8 is also provided with a partial semi-spherical member 58 or igloo which spans the furnace just above the burner section 52. The igloo 58 is formed of refractory material and is provided with a plurality of openings 60 intermediate the furnace wall and the center of the igloo 58 to allow passage of the hot combustion gases to the area directly below the reformer tubes 24. The igloo 58 has arranged on top of it a cylindrical refractory member 64 which serves the dual function of protecting the lower end of the center pipe 26 from direct exposure to the hottest combustion gases and as a receptacle for weighted members such as ceramic balls 65 which counterbalance any lift force imposed by the hot combustion gases below the igloo 58. The igloo or partial semi-spherical member 58 prevents radiant heat from the burner section 8 from reaching the process tubes 24. The only radiation which the process tubes 24 can experience is the small amount of radiation from the combustion gases themselves. The bottom contour of the partial semi-spherical member 58 can be streamlined as best shown in the FIG. 1 to reduce the pressure drop through and lifting force on member 58 caused by the flow of combustion gases.

The furnace 2 is also provided with an upper chamber 66 which is sealed from the convection section by the tube sheet 22 and center tube 26. The upper chamber 66 is an inlet chamber for the hydrocarbon feed. The hydrocarbon feed is introduced into the upper section 66 through inlet opening 68 and passes directly to the process tube inlet tube sections 46.

The furnace 2 is also provided with a flue gas outlet 70 located just below the tube sheet 22 and just above the section 50 of the reformer tubes containing catalyst.

Figure 2:
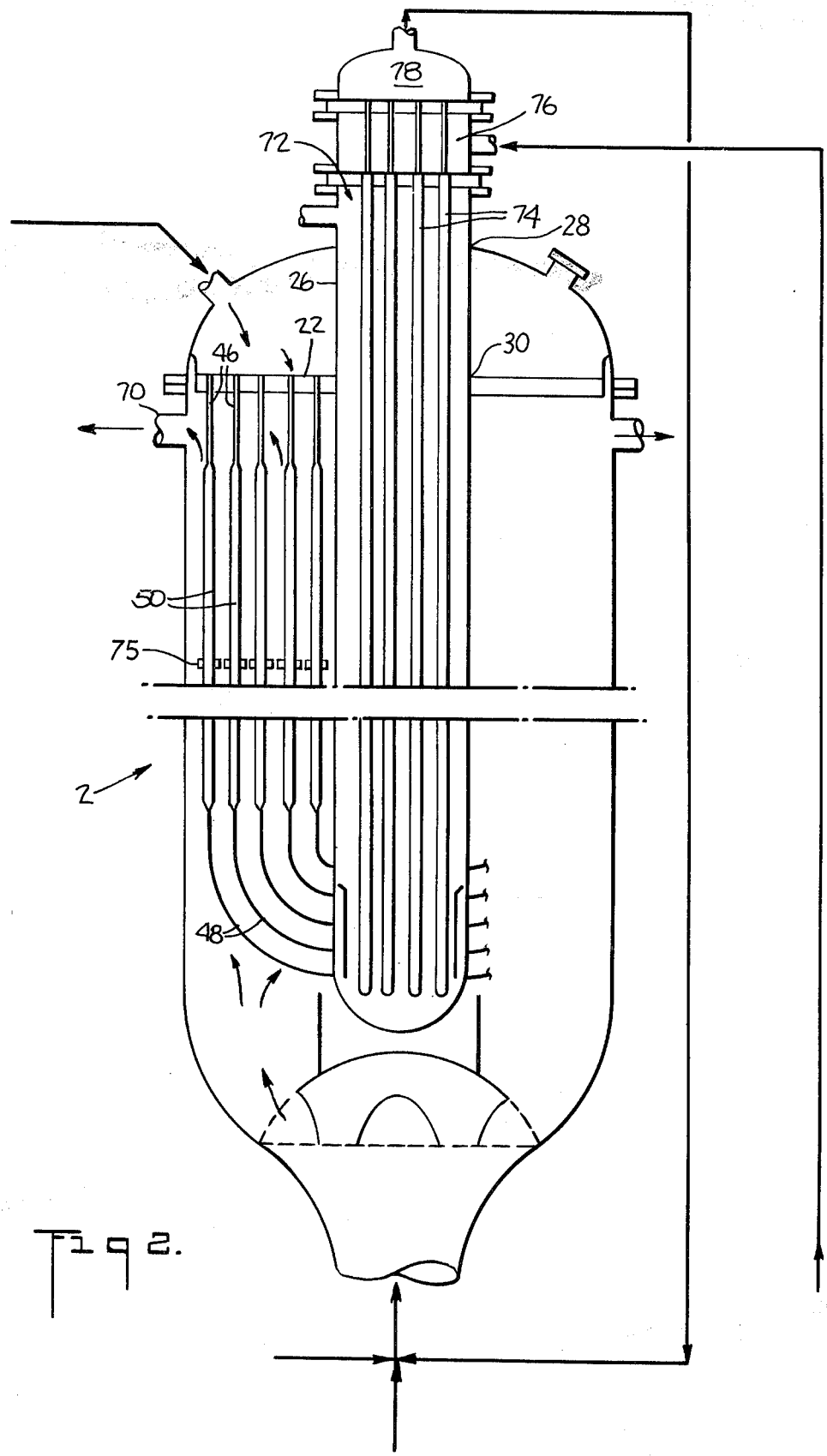
FIG. 2 is a drawing of an alternate embodiment of the furnace of the present invention.

The embodiment of FIG. 2 is virtually identical to that of FIG. 1 with all like parts having like numbers. The only difference is the addition of a heat exchanger unit 72. The heat exchanger 72 is located within the central tube 26 and is preferably comprised of bayonet tubes 74, an inlet section 76 and an outlet section 78. The heat exchanger tubes 74 can carry any fluid but preferably hydrocarbon feed for the reformer furnace is carried. The hot effluent from the reformer tubes passes upwardly around the tubes 74. The flue gas, air, water or other fluid to be heated enters the heat exchanger inlet 76, flows downwardly around the outer concentric chamber of the bayonet tubes 74 and upwardly through the inner concentric chamber of the bayonet tubes 74 to the heat exchanger outlet 78. The process fluid from the reformer tubes 24 thereby transfers heat to the fluid inside the tubes 74 and is coincidently cooled.

Figure 6:
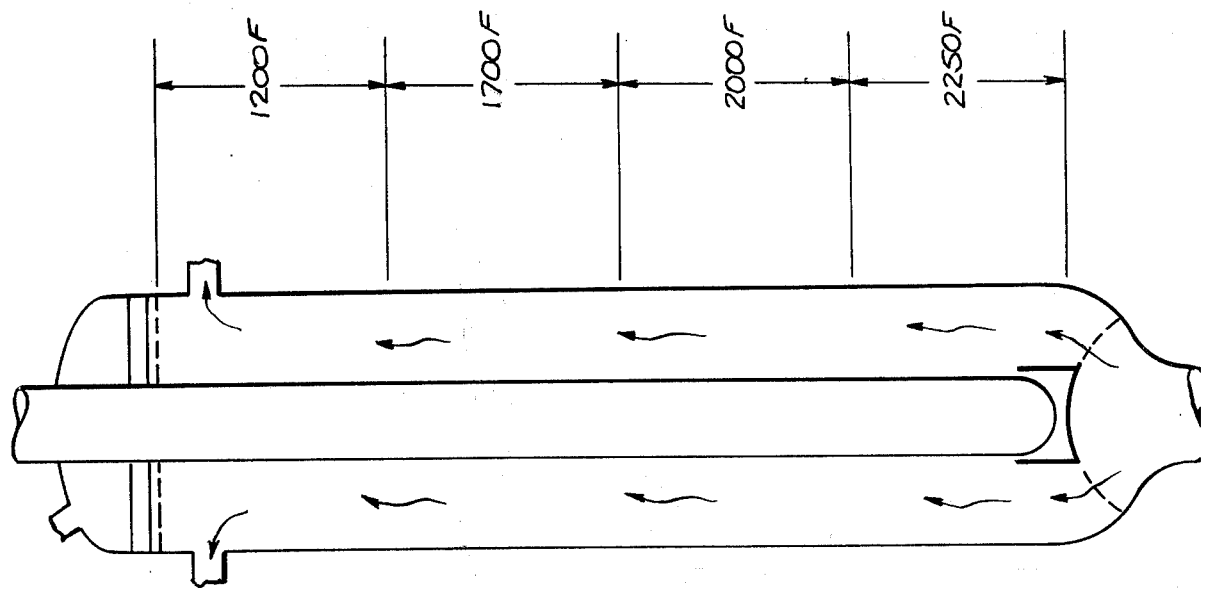
FIG. 6 is a drawing of the furnace of FIG. 2 showing the temperature gradient during reforming operation.

In operation, the furnace 2 of FIGS. 1 and 2 is provided with hydrocarbon feed through inlet 68 which then passes through the reformer inlet tubes 46 to the central section 50 of the reformer tube where catalyst is present. The principal reforming occurs in the catalyst section. The reformed gas or effluent leaves the catalyst bed in the central tube section 50 and for a short duration passes through the reformer outlet tubes 48 to the bottom of the central tube 26 and thereafter upwardly to the top of the furnace 2 and out for further processing. The heat necessary to carry out the reformer reaction is provided by a combination of recycled flue gas and combustion gas generated by fuel and compressed air. The flue gas enters the combustion chamber area 8 through line 113, best seen in FIGS. 1 and 7, at approximately 1,050°F. and 155 psia. Recycle of flue gas to the combustion chamber 8 serves the purpose of controlling the combustion temperature and supplying a portion of the combustion heat. Gaseous fuels such as methane, natural gas or other fuel gases or light liquid fuels such as light naphtha, enters the burner 52 through line 105 at approximately 70°F. and 155 psia. Air for combustion with the gaseous fuel enters through line 104 at about 700°F. and 155 psia. The recycled flue gas from line 113 and the combustion products from burner 52 are then spirally directed through the igloo 58 into the sections of the furnace in contact with the reformer tubes 24. As best seen in FIG. 6, a temperature gradient from approximately 2250°F. at the bottom of the furnace 2 to 1200°F. at the flue gas outlet occurs. Pressure of the combustion gas can be between 100 to 180 psia and preferably between 145 and 155 psia. Practice has shown that a slight pressure drop occurs from the bottom to the top of the furnace and thus the pressure gradient from 155 to 145 psia at the top of the hot gas section occurs. The pressure on the process side is somewhat higher. The hydrocarbon feed enters the furnace 2 at about 300 psia and preferably at 250 psia and the reformed effluent exits from the termination of the center pipe 26 at a pressure about 50 psia lower than the pressure at which the hydrocarbon feed enters the furnace.

The temperature gradient over the furnace is shown in FIG. 6. The temperature ranges shown are for the combustion gas side.

As best seen in FIG. 7, the system of the present invention uses the hot flue gas from the furnace to heat the hydrocarbon feed-steam mixture, generate steam and to drive the turbine for producing the necessary compressed air for the burning operation. The flue gas line 112 passes through the hot side of heat exchanger 80 to heat the steam-hydrocarbon feed in line 114 which terminates in furnace inlet 68. After exiting from the heat exchanger 80, the flue gas passes through the hot side of heat exchanger 82 wherein hydrocarbon feed from line 108 is heated. The heated hydrocarbon feed passes through the cold side of the heat exchanger 82 and is ultimately introduced into the steam-hydrocarbon feed line 114. The flue gas is then split after leaving the hot side of heat exchanger 82 and one portion is passed through line 113 to heat exchanger 86 to generate steam from process water which passes through the cold side of heat exchanger 86. The other portion of the flue gas is delivered through line 112 to a burner 88 wherein it mixes with fuel and compressed air to provide combustion gas to drive the turbine 90 of the air compressor 92. Excess energy produced by the turbine 90 can be used to generate electric power through generator 95 which is in common drive with turbine 90. Air from line 104 is compressed preferably in one main stage air compressor 92 and delivered to high pressure booster compressor 96 for possible further compression and ultimately to the furnace burner 52. Compressors 96 and 98 are preferably connected in common drive with turbine 90 to derive drive power therefrom, but may alternatively be powered by separate motor or other drive means. The flue gas from the turbine 90, along with the other hot gas, passes through heat exchange equipment 94 to generate additional steam for the system. Thereafter, the flue gas is exhausted to atmosphere.

The effluent emanating from the outlet 27 of the center tube 26 of the furnace 2 is passed through line 110 and through the hot side of heat exchanger 100. Flue gas which has exhausted from the hot side of heat exchanger 86 and then elevated in pressure by compressor 98 passes through the cold side of heat exchanger 100 and therein is heated prior to entry into the furnace 2. The effluent in line 110 can then be used to generate steam in heat exchanger 102.

The furnace 2 is fired by fuel from line 105 that is introduced into furnace 2 with compressed air from line 104.

An example of the furnace and system of the invention in operation is set forth. Reforming of methane is shown in the example but it should be understood that higher hydrocarbons such as propane and also prevaporized normally liquid hydrocarbons such as hexane or prevaporized low boiling petroleum fractions such as naphtha may be catalytically reformed with the system and furnace of the present invention. Two furnaces are operated in parallel in this example is as follows:

207,000 lbs/hr. or CH₄ feed at 100°F and 260 psia is delivered from line 108 to the cold side of heat exchanger 82. $3.96 \times 10^6$ lbs/hr. of flue gas combined from two identical furnaces operating in parallel is delivered through line 112 to the hot side of heat exchanger 82 after initial cooling in heat exchanger 80. The 207,000 lbs/hr. of CH₄ is heated to 417°F. and introduced into line 114 to mix with 835,000 lbs/hr. of steam.

The steam-CH₄ mixture is elevated to 1000°F. in heat exchanger 80.

Flue gas from the hot side of heat exchanger 82 is split into two portions. In one portion, $2.43 \times 10^6$ lbs/hr. of flue gas is delivered to line 113 for recycle to the furnaces (i.e. $2.43 \times 10^6/2$ lbs./hr. flue gas to each furnace). Initially the flue gas in line 113 which is at 913°F. passes through the hot side of heat exchanger 86 wherein it generates 214,000 lbs./hr. of steam 417°F. and 300 psia for steam-water line 116.

The flue gas leaves heat exchanger 86 at 600°F. and 135 psia and is elevated to 160 psia in compressor 98 and heated to 1050°F. in heat exchanger 100 prior to entering the furnaces.

The other portion of the flue gas from the hot side of heat exchanger 82 amounts to $1.53 \times 10^6$ lbs/hr. and is at 913°F. and 140 psia. This portion continues in line 112 to burner 88 wherein it mixes with 35,000 lbs/hr. of CH₄ fuel and $0.61 \times 10^6$ lbs/hr. of compressed air to drive turbine 90. The hot gas entering turbine 90 is at 1730°F. and 140 psia and upon discharge from the turbine 90 is at 950°F. and 15 psia.

The gas discharged from turbine 90 is used to generate 325,000 lbs/hr. of steam at 300 psia in unit 94 for delivery through line 116 to line 114. The gas leaving the unit 94 is exhausted to atmosphere.

$1.45 \times 10^6$ lbs/hr. of compressed air is delivered from compressor 92 to compressor 96 at 670°F. and 140 psia. In compressor 96 the air is elevated to 700°F. and 155 psia. From compressor 96 the compressed air is delivered in equal portions through line 104 to the furnace burner 52 of the two parallel reformer furnaces 2.

41,500 lbs hr. of CH₄ fuel at 70°F. and 160 psia is delivered through line 105 to each of the two furnaces 2 at their furnace burner 52 to combust with the $0.725 \times 10^6$ lbs/hr. of compressed air delivered to each furnace through line 104. The combustion gases along with the $2.43 \times 10^6$ lbs/hr. of recycled flue gas at 1050°F. ($1.215 \times 10^6$ lbs/hr. to each furnace) provides the heating service for each of the two furnaces.

In furnace 2, the $0.521 \times 10^6$ lbs/hr. of CH₄ and steam entering each furnace at 1000°F. and 250 psia is reformed over a nickel oxide catalyst by convection from the hot combustion gases and recycled flue gas to an exit temperature of 1550°F. The inlet pressure of the CH₄ feed is 250 psia and the outlet pressure is 200 psia. The pressure of the combustion gases and recycled flue gas is 155 psia at the burner 8 and 145 psia at the flue gas exit 70.

The reformed process fluid is passed in heat exchange relationship with the recycled flue gas in heat exchanger 100 wherein the process fluid temperature is reduced to 1110°F. The effluent from both reformer furnaces is subsequently cooled in heat exchanger 102 wherein 296,000 lbs/hr. of steam is generated for delivery to hydrocarbon-steam line 114. After leaving the hot side of heat exchanger 102, the reformer effluent is sent on for further processing.

1,042,000 lbs/hr. of synthesis gas product of the following composition is produced in this example:

| Component | Mol % |
| --- | --- |
| CH₄ | 1.42 |
| CO₂ | 5.65 |
| CO | 8.75 |
| H₂ | 48.85 |
| H₂O | 35.33 |
| | 100.00 |

The hydrogen plus CO production is 440 MM SCFD at 60°F.

We claim:

1. A reformer furnace comprising:
   a. a burner assembly;
   b. a hot gas convection section;
   c. refractory means for preventing radiant heat from the burner assembly to the convection section;
   d. a fluid process side having process tubes filled with catalyst arranged in the convection section;
   e. a centrally disposed effluent tube suspended from the top of the furnace and in communication with the terminations of the process tubes;
   f. a tube sheet suspending the process tubes, which tube sheet has a centrally disposed opening;
   g. means to attach the tube sheet to the centrally disposed effluent tube at the tube sheet centrally disposed opening for support of the tube sheet by the centrally disposed effluent tube; and
   h. means for joining the tube sheet to the inside wall of the furnace convection section in sealed relationship.

2. A furnace as in claim 1 wherein the tube sheet is comprised of upper and lower sheets and an internal web structure, the upper and lower sheets having aligned openings and the web structure being in alignment with the holes in the upper and lower sheet for the passage of tubes therethrough and further comprising a feed inlet chamber defined on one side by the upper tube sheet of the tube sheet assembly.

3. A furnace as in claim 2 further comprising a plurality of aligned engaging insulating jackets joined to the vessel wall at one end of each jacket; annular purge gas chambers between the insulating jackets and the furnace outer wall, purge gas inlets for each purge gas chamber and means for providing communication between the purge gas chambers and the furnace interior hot gas side, said purge gas chambers operating at a pressure above the pressure of the convection section of the furnace.

4. A furnace as in claim 2 wherein the means for preventing radiation heat from reaching the convection section is a partial semi-spherical structure located transversely between the furnace burner assembly and the hot gas convection section, said partial semi-spherical structure having perforations therein adjacent the furnace wall to allow the combustion gas from the burner to enter the convection chamber.

5. A furnace as in claim 4 further comprising a cylindrical refractory member extending upwardly from the partial semi-spherical heat radiation prevention structure concentrically with the central tube to protect the bottom of the central tube.

6. A furnace as in claim 5 further comprising additional means for opposing any upward force on the partial semi-spherical heat radiation prevention structure.

7. A furnace as in claim 6 wherein the additional means for opposing any upward force on the partial semi-spherical heat radiation prevention structure comprises dense ceramic balls located in the cylindrical member extending upwardly from the partial semi-spherical heat radiation prevention member.

8. A furnace as in claim 2 further comprising means for preventing excessive deflection of the process tubes and for preventing channeling of the flue gas within the furnace convection section.

9. A furnace as in claim 8 wherein the means for preventing excessive deflection of the process tubes and for preventing channeling of the flue gas within the convection section is comprised of corbelling on the inner wall of the furnace and tube guides extending from the centrally disposed center tube.

10. A furnace as in claim 2 further comprising process tube outlet sections which are smaller in diameter than the process tubes and which are skewed to extend from the process tubes to the center tube in a somewhat helical path.

11. A furnace as in claim 2 further comprising a thermal shroud arranged around the portion of the central tube which extends from an intermediate location on the central tube to the bottom of the central tube.

12. A furnace as in claim 2 further comprising a flow deflector in the bottom of the central tube to deflect flow from the process tubes to the bottom of the central tube.

13. A furnace as in claim 2 further comprising a bayonet heat exchanger in the center tube.

14. A furnace as in claim 2 wherein the openings in the upper and lower sheets of the tube sheet assembly are of smaller diameter than the process tubes and further comprising process tube inlet sections of the same diameter as the holes in the upper and lower sheets of the tube sheet assembly.

15. A furnace as in claim 14 wherein the process tube inlet sections are secured to the upper sheet of the tube sheet assembly at each opening in the upper sheet of the tube sheet assembly.

* * * * *